April 6, 1943. H. C. GUHL 2,315,615
MOLDED ARTICLE
Filed July 24, 1940
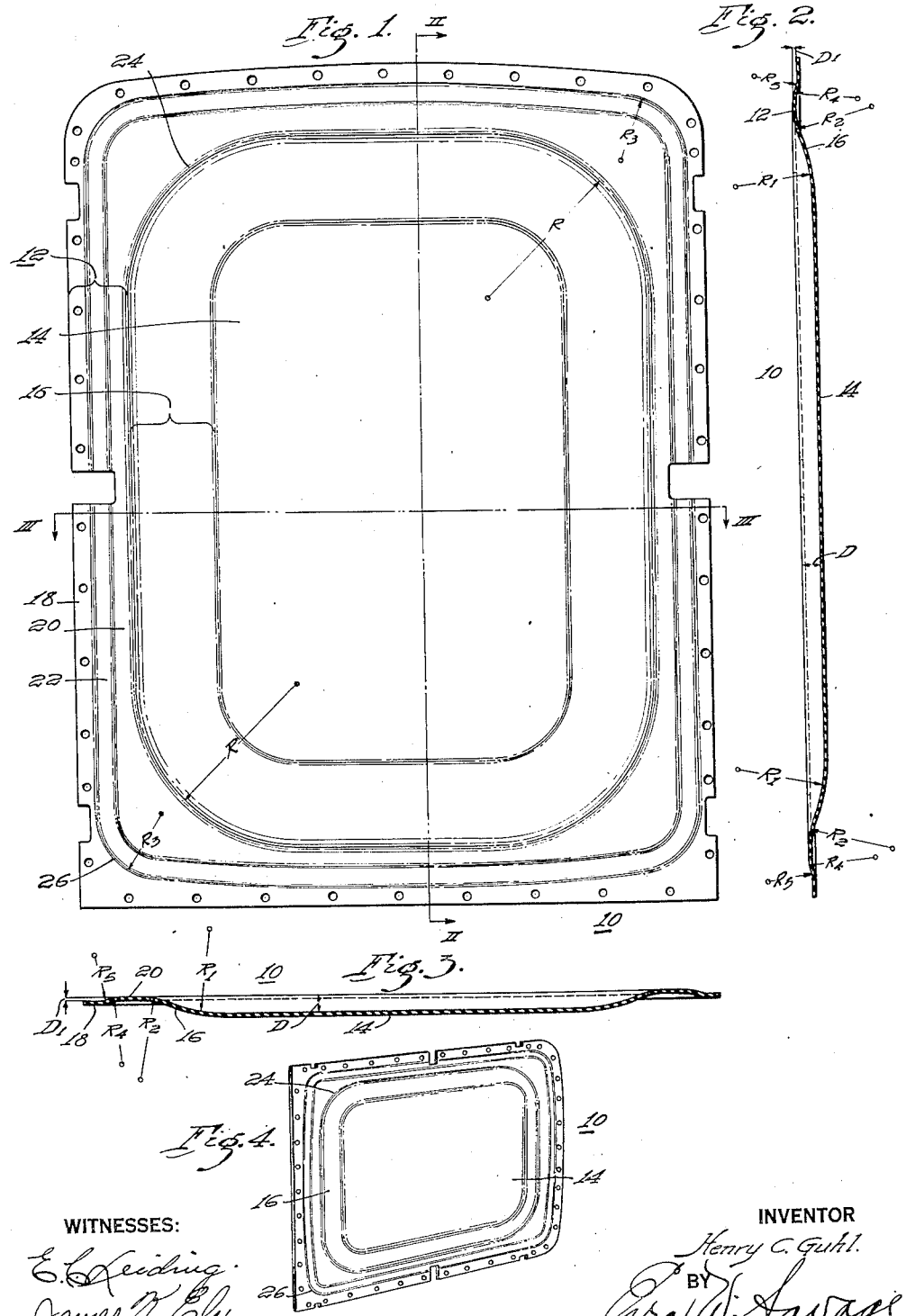

Patented Apr. 6, 1943

2,315,615

UNITED STATES PATENT OFFICE 2,315,615

MOLDED ARTICLE

Henry C. Guhl, Wilkinsburg, Pa., assignor to Westinghouse Electric & Manufacturing Company, East Pittsburgh, Pa., a corporation of Pennsylvania Application July 24, 1940, Serial No. 347,231

5 Claims. (Cl. 154—45.9)

This invention relates to molded laminated articles, and particularly to molded panels for refrigerator doors.

In molding articles having curved surfaces from laminated resin impregnated fibrous sheet material, it has been found necessary in the past to employ draw rings or special build-up inserts in order to produce the article with a substantially uniform thickness. In industrial manufacturing processes the use of such draw rings and build-up inserts slows up production and adds to the manufacturing cost.

An object of this invention is to produce a molded panel for a refrigerator door, the molded panel having a predetermined curved contour and a substantially uniform thickness and being of laminated resin impregnated fibrous sheet material free from inserts.

Other objects of this invention will become apparent from the following description when taken in conjunction with the accompanying drawing, in which:

Figure 1 is a plan view of a molded panel embodying the features of this invention;

Fig. 2 is a view in section of the panel taken along the line II—II of Fig. 1;

Fig. 3 is a view in section of the panel taken along the line III—III of Fig. 1; and Fig. 4 is a perspective view of the panel of Fig. 1;

The laminated article of this invention is formed under heat and pressure from a plurality of laminated fibrous sheets impregnated with a resinous binder formed without the use of draw rings or special build-up inserts. Although different resinous binders may be employed, it is preferred to form the laminated article from a composite stack of impregnated fibrous sheets which is fully disclosed in my copending application Serial No. 347,233, filed July 24, 1940, and assigned to the same assignee as this application. In my copending application Serial No. 347,233, the stack to be molded is disclosed as comprising a base portion of laminated fibrous sheets, preferably of kraft paper, of substantially the same size impregnated with a phenolic condensation resin and a surface sheet of alpha pulp paper so impregnated with phenolic condensation resin as to have one surface thereof substantially free from the phenolic resin and carrying a surface coating thereon of a urea resin. Articles of the stacked sheets have been successfully made where the resin content ratio of the impregnated laminated and stacked sheets of the base portion is preferably substantially between 1.4 and 1.5 when the resin content ratio of the surface sheet is substantially between 1.8 and 2.2. The urea resin coating contains a predetermined amount of paper fibers and a coloring pigment for imparting to the molded surface certain desired characteristics such as resistance to crazing, resistance to wear and a predetermined color.

Referring to Figs. 1, 2 and 3 of the drawing, there is illustrated a panel 10 for a refrigerator door consolidated under heat and pressure from the stack of laminated resin impregnated cellulosic fibrous sheets which is free from inserts. It is preferred to mold the panel in accordance with the method disclosed and claimed in my copending application Serial No. 347,232, filed July 24, 1940, now Patent No. 2,276,035, and assigned to the same assignee as this invention. Preferably the panel 10 is molded at a temperature of about 140° C. for a period of time of about 50 minutes under a pressure of 1500 lbs. per square inch.

Referring to the drawing, the panel 10 consolidated under heat and pressure from the stacked laminated sheets of resin impregnated fibrous material has a predetermined curved shape, the panel consisting of a continuous peripheral flange portion 12, an interior portion 14 which is offset relative to the continuous flange portion 12 and a portion 16 of reverse curve shape for integrally connecting the peripheral flange portion 12 and the interior offset portion 14. In the embodiment illustrated, the peripheral flange portion 12 is composed of two substantially parallel sections 18 and 20 which are disposed in different planes and a connecting portion 22 of reverse curve shape for integrally connecting the parallel sections of the flange. In this embodiment, it is to be noted that the continuous flange portion 12 is provided with four interior curved corners 24 for integrally and smoothly connecting with the connecting portion 16 of reverse curve shape which connects the flange 12 and the interior offset portion 14 of the panel. Likewise the connecting portion 22 of reverse curve shape connecting the parallel sections of the flange 12 has four exterior curved corners 26 for continuously and smoothly connecting with the outer parallel section 18 of the continuous flange 12.

The interior curved corners 24 of the continuous flange 12 and the exterior curved corners 26 of the connecting portion 22, as well as the curvatures of the connecting portions 16 and 22 of reverse curve shape are predetermined for securing a smooth molded surface free from visible creases or breaks while at the same time obtaining a substantially uniform thickness throughout the molded panel. The proper selection of these curved corners and the curvatures of the connecting portions of reverse curve shape makes possible the production of the molded panel 10 from the stacked laminated resin impregnated fibrous sheets without the use of draw rings or special build-up inserts. These curvatures are so selected that the molded panel will have a predetermined fill factor and draw factor at the curved corners and the reverse curve-shape connecting portions, respectively, so that an excess of material will not be created at the curved corners under the molding action nor will a deficiency of material be obtained in the connecting portions under the molding action.

The terms "fill factor" and "draw factor" referred to hereinbefore are purely arbitrary and can readily be determined by an empirical mathematical expression.

The fill factor for the curved corners of the molded panel can be readily obtained from the expression, $$\text{fill factor} = \frac{D \times Ra}{R}$$

where D is the depth in inches between the flange portion and the offset portion as illustrated in Figs. 2 and 3, $Ra$ is the radians of the arc of the interior curved corner 24, and R is the radius in inches of the interior curved corner 24. Similarly, the fill factor at the curved corners 26 can be found from the expression, $$\text{fill factor} = \frac{D_1 \times Ra_3}{R_3}$$

where $D_1$ is the depth in inches between the parallel sections of the flange portion 12, $Ra_3$ is the radians of the arc of the curved corner 26 and $R_3$ is the radius in inches of the curved corner 26.

The draw factor for the connecting portion 16 can be determined by the expression, $$\text{draw factor} = \frac{D \times (Ra_1 + Ra_2)}{R_1 + R_2}$$

where D is the depth in inches between the flange portion 12 and the offset portion 14, $Ra_1$ and $Ra_2$ are the radians of the arcs of the curves of the reverse curve connecting portion 16 as illustrated in Figs. 2 and 3, and $R_1$ and $R_2$ are the radii in inches of the curves of the reverse curve portion. Similarly, the draw factor for the connecting portion 22 can be determined by the expression, $$\text{draw factor} = \frac{D_1 \times (Ra_4 + Ra_5)}{R_4 + R_5}$$

where $D_1$ is the depth in inches between the parallel sections of the flange 12, as shown in Figs. 2 and 3, $Ra_4$ and $Ra_5$ are the radians of the arcs of the curves of the connecting portions 22 and $R_4$ and $R_5$ are the radii in inches of the curves of the reverse curves forming the connecting portion 22.

In practice it has been determined that the fill factor for the panel 10 at the curved corners 24 and 26 should not be more than approximately .52 when the draw factor of the connecting portions 16 and 22 is not more than approximately .16. Although satisfactory results can be obtained with a fill factor and a draw factor of .52 and .16, respectively, due to manufacturing demands, it is preferred that the fill factor and the draw factor be not more than approximately .26 and .10, respectively. Utilizing a fill factor and draw factor of this value for a given laminated article having a thickness of between $\frac{1}{16}''$ and $\frac{3}{32}''$, a smooth molded article is obtained without the use of draw rings or inserts, the molded panel being free from visible creases or wrinkles and having a substantially uniform thickness.

In formulating and determining the empirical formulae given hereinbefore, numerous panels were experimentally produced. One of the panels of the impregnated cellulosic fibrous sheets which was satisfactory had a depth D between the interior portion and the peripheral flange portion of 1 inch, and a radius R of 3 inches for the curve corners, with the arc of the curve having a radian $Ra$ of 1.57. Thus the fill factor in accordance with the expression, $$\text{fill factor} = \frac{D \times Ra}{R}$$

is .52. On the same panel the reverse curve section between the interior portion and the peripheral flange portion had radii $R_1$ and $R_2$ each of 3.5 inches and radians $Ra_1$ and $Ra_2$ each of .524 to give a draw factor of .15 in accordance with the expression, $$\text{draw factor} = \frac{D \times (Ra_1 + Ra_2)}{R_1 + R_2}$$

In another panel having the same depth D and the same radians $Ra$, the radius R was changed to 6 inches and the resulting fill-factor is .26. In this panel, the radians $Ra_1$ and $Ra_2$ are the same as in the previous example, but the radii $R_1$ and $R_2$ are 6 inches and 2 inches, respectively. With these changes, the draw factor is found to be .131.

As another example of panels produced which are free from inserts in accordance with this invention, reference may be had to the type of panels shown in Figs. 1, 2 and 3 of the drawing, and specifically where D is three-quarters of an inch, $Ra$ is 1.57, R is 7.5 inches, $Ra_1$ is .35, $Ra_2$ is .35, $R_1$ is 8 inches, $R_2$ is 3.5 inches, $D_1$ is one-eighth of an inch, $Ra_3$ is 1.57, $R_3$ is 3 inches, $Ra_4$ is .26, $Ra_5$ is .26, $R_4$ is 3 inches, and $R_5$ is 2 inches. With this type of panel, it is found by substituting these values in the formulae given that the fill factor and draw factor of the inside corner 24 are .16 and .045, respectively, and the fill factor and draw factor of the outside corner 26 are .065 and .013, respectively.

After the laminated resin impregnated fibrous sheets are molded to a predetermined curved shape utilizing the fill factor and draw factor for determining the curved contour of the resulting product as referred to hereinbefore, the shaped panel 10 can be trimmed and cut as shown in Figs. 1 and 4 for receiving the various hinges, lugs and screws when the panel is utilized as a part of a refrigerator door. The molded panel is found to have a substantially uniform thickness throughout its body, any variations in thickness at the curved portions being negligible when the shape of the article is determined in accordance with the empirical expressions for the fill factor and draw factor within the limits given hereinbefore. By molding the panel from the laminated material incorporating the fill factor and draw factor in the design of the panel, it is possible to produce the panel without the use of special draw rings or build-up inserts and to give the surface an extremely smooth uniform appearance free from creases or wrinkles while maintaining a substantially uniform thickness throughout the panel.

Although this invention has been described with reference to a particular embodiment thereof, it is, of course, not to be limited thereto except insofar as is necessitated by the scope of the appended claims.

I claim as my invention:

1. A molded panel comprising, a base portion composed of a plurality of laminated sheets of kraft paper impregnated with a resinous binder, a surface sheet of alpha pulp paper impregnated with a resinous binder, the resin content ratio of the base portion being between 1.4 and 1.5 when the resin content ratio of the surface sheet is between 1.8 and 2.2, the base portion and surface sheet being consolidated under heat and pressure into an integral unit having a thickness of $\frac{1}{16}$ to $\frac{3}{32}$ of an inch and a predetermined shape consisting of a continuous peripheral flange portion having interior curved corners, an interior portion offset relative to the flange, and a portion of reverse curve shape connecting the peripheral flange portion and the offset interior portion, the unit having a fill factor at the interior curved corners of not more than approximately .52 and a draw factor at the connecting portion of not more than approximately .16 to give a unit having a substantially uniform thickness free from inserts, the fill factor being determined by the expression $$\frac{D \times Ra}{R}$$

where D is the depth in inches between the flange portion and the offset portion, Ra is the radians of the arc of the interior curve, and R is the radius in inches of the interior curve when the draw factor is determined by the expression $$\frac{D \times (Ra_1 + Ra_2)}{R_1 + R_2}$$

where D is the depth in inches between the flange portion and the offset portion, $Ra_1$ and $Ra_2$ are the radians of the arcs of the reverse curve of the connecting portion and $R_1$ and $R_2$ are the radii in inches of the curves of the reverse curve.

2. A molded panel for a refrigerator door comprising, a base portion composed of laminated sheets of kraft paper impregnated with phenolic condensation resin, a surface sheet of alpha pulp paper so impregnated with phenolic condensation resin as to have one of its surfaces substantially free from the impregnating resin, and a coating of urea resin carried by and impregnating the surface of the surface sheet which is substantially free from the phenolic condensation resin, the resin content ratio of the base portion being between 1.4 and 1.5 when the resin content ratio of the surface sheet is between 1.8 and 2.2, the base portion, surface sheet and coating being consolidated under heat and pressure into an integral unit having a thickness of $\frac{1}{16}$ to $\frac{3}{32}$ of an inch and a predetermined shape consisting of a continuous peripheral flange portion having interior curved corners, an interior portion offset relative to the flange, and a portion of reverse curve shape connecting the peripheral flange portion and the offset interior portion, the unit having a fill factor at the interior curved corners of not more than approximately .52 and a draw factor at the connecting portion of not more than approximately .16 to give a unit having a substantially uniform thickness free from inserts, the fill factor being determined by the expression $$\frac{D \times Ra}{R}$$

where D is the depth in inches between the flange portion and the offset portion, Ra is the radians of the arc of the interior curve, and R is the radius in inches of the interior curve when the draw factor is determined by the expression $$\frac{D \times (Ra_1 + Ra_2)}{R_1 + R_2}$$

where D is the depth in inches between the flange portion and the offset portion, $Ra_1$ and $Ra_2$ are the radians of the arcs of the reverse curve of the connecting portion and $R_1$ and $R_2$ are the radii in inches of the curves of the reverse curve.

3. A molded panel comprising, a base portion composed of a plurality of laminated sheets of kraft paper impregnated with a resinous binder, a surface sheet of alpha pulp paper impregnated with a resinous binder, the resin content ratio of the base portion being between 1.4 and 1.5 when the resin content ratio of the surface sheet is between 1.8 and 2.2, the base portion and surface sheet being consolidated under heat and pressure into an integral unit having a thickness of $\frac{1}{16}$ to $\frac{3}{32}$ of an inch and a predetermined shape consisting of a continuous peripheral flange portion having interior curved corners, an interior portion offset relative to the flange portion, and a portion of reverse curve shape connecting the peripheral flange portion and the offset interior portion, the peripheral flange portion being composed in different planes and a connecting portion of reverse curve shape having exterior curved corners for connecting the parallel sections, the unit having a fill factor at the interior curved corners of the flange and the exterior curved corners of the connecting portion between the parallel sections of the flange of not more than .52 and a draw factor at each of the connecting portions between the parallel sections of the flange and the flange and offset portion of not more than .16 to give a unit having a substantially uniform thickness free from inserts.

4. A molded panel for a refrigerator door comprising, a base portion composed of laminated sheets of kraft paper impregnated with phenolic condensation resin, a surface sheet of alpha pulp paper so impregnated with phenolic condensation resin as to have one of its surfaces substantially free from the impregnating resin, and a coating of urea resin carried by and impregnating the surpace of the surface sheet which is substantially free from the phenolic condensation resin, the resin content ratio of the base portion being between 1.4 and 1.5 when the resin content ratio of the surface sheet is between 1.8 and 2.2, the base portion, surface sheet and coating being consolidated under heat and pressure into an integral unit having a thickness of $\frac{1}{16}$ to $\frac{3}{32}$ of an inch and a predetermined shape consisting of a continuous peripheral flange portion having interior curved corners, an interior portion offset relative to the flange, and a portion of reverse curve shape connecting the peripheral flange portion and the offset interior portion, the peripheral flange portion being composed of two substantially parallel sections disposed in different planes and a connecting portion of reverse curve shape having exterior curved corners for connecting the parallel sections, the unit having a fill factor at the interior curved corners of the flange and the exterior curved corners of the connecting portion between the parallel sections of the flange of not more than .52 and a draw factor at each of the connecting portions between the parallel sections of the flange and the flange and offset portion of not more than .16 to give a unit having a substantially uniform thickness free from inserts.

5. A molded panel for a refrigerator door comprising, a main base portion composed of laminated sheets of kraft paper impregnated with phenolic condensation resin, a thin surface sheet of cellulosic fibrous material different from the base portion and so impregnated with phenolic condensation resin as to have one of its surfaces substantially free therefrom, and a coating of another resin carried by and impregnating the surface of the surface sheet which is substantially free from the phenolic condensation resin, the resin content ratio of the base portion being between 1.4 and 1.5 when the resin content ratio of the surface sheet is between 1.8 and 2.2, the base portion and surface sheet being consolidated under heat and pressure into an integral unit having a thickness of $\frac{1}{16}$ to $\frac{3}{32}$ of an inch and a predetermined shape consisting of a continuous peripheral flange portion having interior curved corners, an interior portion offset relative to the flange, and a portion of reverse curve shape connecting the peripheral flange portion and the offset interior portion, the unit having a fill factor at the interior curved corners of not more than approximately .52 and a draw factor at the connecting portion of not more than approximately .16 to give a unit having a substantially uniform thickness free from inserts, the fill factor being determined by the expression $$\frac{D \times Ra}{R}$$

where D is the depth in inches between the flange portion and the offset portion, $Ra$ is the radian of the arc of the interior curve, and R is the radius in inches of the interior curve when the draw factor is determined by the expression $$\frac{D \times (Ra_1 + Ra_2)}{R_1 + R_2}$$

where D is the depth in inches between the flange portion and the offset portion, $Ra_1$ and $Ra_2$ are the radians of the arcs of the reverse curve of the connecting portion and $R_1$ and $R_2$ are the radii in inches of the curves of the reverse curve.

HENRY C. GUHL.